United States Patent
Chen

(10) Patent No.: US 11,405,419 B2
(45) Date of Patent: Aug. 2, 2022

(54) PREVENTING ADVANCED PERSISTENT THREAT ATTACK

(71) Applicant: NEW H3C TECHNOLOGIES CO., LTD., Hangzhou (CN)

(72) Inventor: Youkun Chen, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 181 days.

(21) Appl. No.: 16/498,371

(22) PCT Filed: Mar. 23, 2018

(86) PCT No.: PCT/CN2018/080223
§ 371 (c)(1),
(2) Date: Sep. 26, 2019

(87) PCT Pub. No.: WO2018/177210
PCT Pub. Date: Oct. 4, 2018

(65) Prior Publication Data
US 2021/0112092 A1    Apr. 15, 2021

(30) Foreign Application Priority Data

Mar. 27, 2017   (CN) .......................... 201710188038.X

(51) Int. Cl.
*H04L 9/40*   (2022.01)

(52) U.S. Cl.
CPC ...... *H04L 63/1466* (2013.01); *H04L 63/0236* (2013.01); *H04L 63/0892* (2013.01);
(Continued)

(58) Field of Classification Search
CPC ............. H04L 63/1466; H04L 63/0236; H04L 63/0892; H04L 63/101; H04L 63/1416; H04L 63/1433; H04L 63/14
See application file for complete search history.

(56) References Cited

U.S. PATENT DOCUMENTS 9,654,485 B1 *   5/2017   Neumann ........... H04L 63/1441
2015/0096024 A1   4/2015   Haq et al.
(Continued)

FOREIGN PATENT DOCUMENTS

CN   101610174 A   12/2009
CN   103916385 A   7/2014
(Continued)

OTHER PUBLICATIONS

Wu, P. et al., "Research of Cyber Security Situation Awareness Base on APT Attack Chain," Telecom Engineering Technics and Standardization, vol. 28, No. 219, Dec. 31, 2015, 5 pages. (Submitted with English Abstract).

Cheng, S. et al., "Analysis of APT Attack Principle and Protection Technology," Netinfo Security, vol. 2016, No. 9, Jul. 25, 2016, 6 pages. (Submitted with English Abstract).
(Continued)

*Primary Examiner* — Huan V Doan
(74) *Attorney, Agent, or Firm* — McCoy Russell LLP

(57) ABSTRACT

Methods, systems for preventing an APT attack and non-transitory machine-readable storage mediums are disclosed. In one aspect, communication data is obtained in a network, association analysis is performed for the communication data, threat data is obtained from the communication data based on an association analysis result, each piece of the obtained threat data is mapped to a corresponding APT attack phase based on a kill chain model; and for each piece of threat data, prevention is performed for a network entity associated with the piece of the threat data based on prevention strategies corresponding to the plurality of APT attack phases.

11 Claims, 2 Drawing Sheets

(52) U.S. Cl.
CPC ........ *H04L 63/101* (2013.01); *H04L 63/1416* (2013.01); *H04L 63/1433* (2013.01)

(56) References Cited

U.S. PATENT DOCUMENTS

| | | | | |
|---|---|---|---|---|
| 2015/0108349 | A1* | 4/2015 | Bendahan | G01V 5/0016 250/306 |
| 2015/0372980 | A1* | 12/2015 | Eyada | H04L 63/1416 726/1 |
| 2016/0112445 | A1* | 4/2016 | Abramowitz | H04L 63/1425 726/23 |
| 2016/0156656 | A1* | 6/2016 | Boggs | H04L 63/1425 726/25 |
| 2016/0300227 | A1 | 10/2016 | Subhedar et al. | |
| 2017/0063897 | A1 | 3/2017 | Muddu et al. | |
| 2017/0070518 | A1 | 3/2017 | Manadhata et al. | |
| 2017/0223030 | A1* | 8/2017 | Merza | H04L 63/1416 |
| 2017/0223046 | A1* | 8/2017 | Singh | H04L 63/1491 |

FOREIGN PATENT DOCUMENTS

| | | |
|---|---|---|
| CN | 103916406 A | 7/2014 |
| CN | 104283889 A | 1/2015 |
| CN | 105024976 A | 11/2015 |
| CN | 106209867 A | 12/2016 |
| CN | 106357689 A | 1/2017 |
| CN | 107888607 A | 4/2018 |
| EP | 3484118 A1 | 5/2019 |
| JP | 2005136526 A | 5/2005 |
| JP | 2015121968 A | 7/2015 |
| WO | 2016089567 A1 | 6/2016 |

OTHER PUBLICATIONS

ISA State Intellectual Property Office of the People's Republic of China, International Search Report Issued in Application No. PCT/CN2018/080223, dated Jun. 13, 2018, WIPO, 6 pages.
State Intellectual Property Office of the People's Republic of China, Office Action and Search Report Issued in Application No. 201710188038.X, dated Mar. 29, 2019, 14 pages (Submitted with Partial Translation).
State Intellectual Property Office of the People's Republic of China, Office Action and Search Report Issued in Application No. 201710188038.X, dated Sep. 10, 2019, 10 pages. (Submitted with Partial Translation).
Muto, K. et al., "Experimental Results on an Attack Detection System for Advanced Persistent Threats," The Institute of Electronics, Information and Communication Engineers, IEICE Technical Report IA2015-9, ICSS2015-9, vol. 115, No. 81, Jun. 4, 2015, 8 pages. (Submitted with English Abstract).
Japanese Patent Office, Office Action Issued in Application No. 2019-552980, dated Oct. 6, 2020, 9 pages. (Submitted with Machine Translation).
Hutchins, E. et al., "Intelligence-Driven Computer Network Defense Informed by Analysis of Adversary Campaigns and Intrusion Kill Chains" Internal Journal of Critical Infrastructure Protection, Dec. 1, 2015, 14 pages.
ISA State Intellectual Property Office of the People's Republic of China, Written Opinion of the International Searching Authority Issued in Application No. PCT/CN2018/080223, dated Jun. 13, 2018, WIPO, 4 pages.
European Patent Office, Extended European Search Report Issued in Application No. 18774308.3, dated Jan. 16, 2020, Germany, 9 pages.
European Patent Office, Office Action Issued in Application No. 18774308.3, dated Oct. 12, 2021, Netherlands, 5 pages.

* cited by examiner

PREVENTING ADVANCED PERSISTENT THREAT ATTACK

CROSS REFERENCE TO RELATED APPLICATIONS

This present application is a U.S. National Phase of International Patent Application Ser. No. PCT/CN2018/080223 ENTITLED "DEFENCE ADAINST APT ATTACK," filed on Mar. 23, 2018. International Patent Application Ser. No. PCT/CN2018/080223 claims priority to Chinese Patent Application No. 201710188038.X filed on Mar. 27, 2017. The entire contents of each of the above-cited applications are hereby incorporated by reference in their entirety for all purposes.

BACKGROUND

An Advanced Persistent Threat (APT) can be a specific attack launched by a professional hacker group or a national hacker for governments, energy departments, finance departments, enterprises, etc. The APT attack can have a complete, well-planned attack process.

DETAILED DESCRIPTION OF THE EMBODIMENTS

Figure 1:
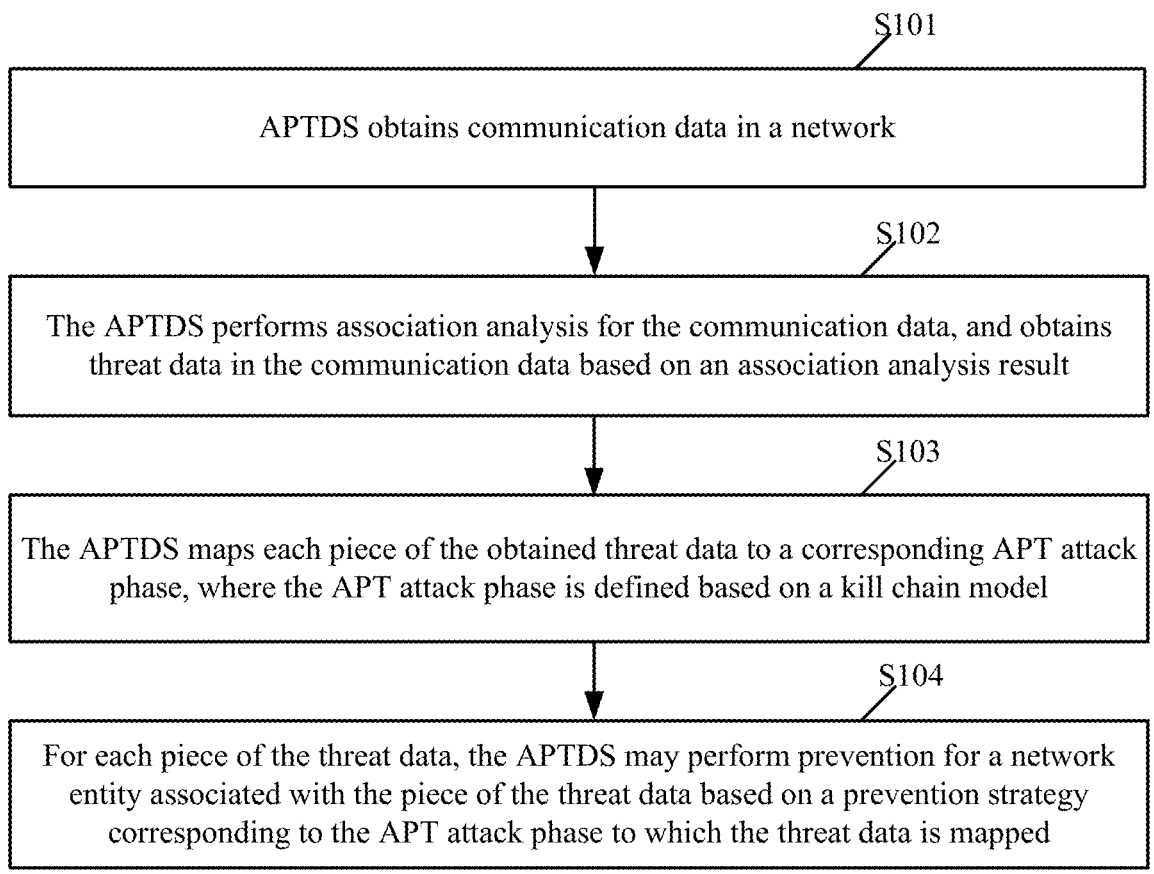
FIG. 1 is a flowchart illustrating a method based on an example of the present disclosure.

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

An APT attack may have characteristics as follows. 1) An attack purpose is more and more definite, an attack area is more focused on, and attacked fields extend from a single computer network to an industrial control system, and the attack is more specific to large enterprises, national infrastructures and key devices. 2) An attack behavior is difficult to be detected. Since zero-day loopholes, new Trojans and phishing attacks are employed in the APT attack, it can be quite difficult to effectively detect the attack by using a feature-based security detection method. For example, Flame virus can have characteristics of Worm, Backdoor, Botnet and social engineering, and can have an amount of program code up to 650 thousand lines, which is 100 times of a common spyware. 3) The attack is extremely undetectable and continues for a long time. An APT attack can well avoid to be detected by a defense facility before bursting, and can have an increasingly long latency, so as to gather a large amount of confidential information. Based on its un-detectability, there can be a lot of undetected threats, which seriously threaten national security and citizen rights.

Based on the characteristics of the APT attacks, a kill chain is introduced in an example of the present disclosure. The kill chain may include a complete process of performing "detecting, positioning, tracking, targeting, attacking and evaluating". An APT attack process may be divided into 7 phases based on the kill chain as follows.

Phase 1 includes reconnaissance. In the phrase 1, a target network is selected and known through social engineering, and vulnerability of a destination is sensed through a scanning technology.

Phase 2 includes weaponization. In the phrase 2, a directional attack tool is made, such as a pdf file or office file with malicious codes.

Phase 3 includes delivery. In the phrase 3, the attack tool is delivered to a target system through a way such as an email, a website (Trojan) and USB flash disk.

Phase 4 includes exploitation. In the phrase 4, the attack tool is triggered to be run on the target system through a loophole of an application on the target system or a loophole of an operating system on the target system.

Phase 5 includes installation. In the phrase 5, remote control program (such as a Trojan, and a malicious plug-in) is installed.

Phase 6 includes command and control. In the phrase 6, a communication channel is established with an control server in an Internet, e.g., a server for controlling the Trojan.

Phase 7 includes actions on objectives. In the phrase 7, a desired attack behavior is executed, such as an attack behavior of stealing information, an attack behavior of tampering with information or an attack behavior of performing another sabotage activity.

However, some phases in the 7 phases above cannot be detected. For example, the weaponization phase cannot be detected because there is no trace left on the network. Hence, based on an example of the present disclosure, an APT attack process may be re-divided into a plurality of detectable ATP attack phases based on the kill chain model above, and threats in the network may be respectively classified into corresponding detectable ATP attack phases, and respective prevention strategies can be taken for the threats classified into different APT attack phases.

A method provided based on an example of the present disclosure is described below with reference to FIG. 1.

FIG. 1 is a flowchart illustrating a method based on an example of the present disclosure. The method can be applied to an APT Defense System (APTDS) based on an example of the present disclosure. As shown in FIG. 1, the method includes procedures as follows.

At block 101, the APTDS obtains communication data in a network.

In an example of the present disclosure, the communication data may include an event, a flow, threat intelligence and loophole data. Further, the event may include a security event, an operating system event, a database event, an application event, and an authentication event. The flow here may include an original flow associated with an APT attack and a flow log for recording a communication action of network access.

A collection process for different types of communication data mentioned above is described below. The APTDS may initiatively obtain the communication data from different communication data source, or, the different communication data sources may initiatively send new communication data to the APTDS, which is not be limited herein.

1) Event Collection

An event may be from an entity having a security check function, such as a Firewall (FW), an Intrusion Prevention System (IPS), an operating system (e.g., Windows), a database, an Authentication-Authorization-Accounting (AAA) server, an application, etc. When the entity above detects an abnormal condition or an event desired to be focused on, corresponding record is made.

For example, when the FW or the IPS determines that a Distributed Denial of Service (DDOS) attack is launched from a particular source Internet Protocol (IP) address, information such as the source IP address from which the DDOS attack is launched and an IP address of an attacked object is recorded as a security event. When an AAA server detects that a particular IP address is being authenticated, an authentication condition (e.g., whether the authentication passes, or whether there is a password guessing behavior) may be recorded in a local server of the APTDS as an authentication event. When an application detects a behavior of threatening the application, such as stealing, modifying or deleting configuration data of the application from a particular IP address, an application event may be recorded. When a database detects a behavior of threatening a database, such as authority enhancement and Structured Query Language (SQL) injection, a database event may be recorded.

After the event is generated, the above entity having the security check function may send the event to the APTDS via a standard Syslog (a function for recording to System Log). Alternatively, the above entity having the security check function may record the event in a local file, and the event is allowed to be obtained by the APTDS via protocols such as HyperText Transfer Protocol (HTTP) and File Transfer Protocol (FTP). Alternatively, an APTDS proxy may be implemented and installed in the above entity having the security check function to obtain the event, and the event may be sent to the APTDS through a proprietary protocol (such as a User Datagram Protocol (UDP)-based proprietary protocol). Types of events collected by the APTDS, corresponding collection points and corresponding collection technologies are shown in Table 1.

TABLE 1

| Event Type | Collection Point | Collection Technology |
|---|---|---|
| Security Event | Firewall | Receive Syslog |
| Security Event | IPS | Receive Syslog |
| Operating System Event | Switch | Receive Syslog |
| Operating System Event | Router | Receive Syslog |
| Operating System Event | Operating System | Obtain via a WMI (a system plug-in), Telnet (a remote terminal protocol)/Secure Shell Protocol (SSH) |
| Operating System Event | Database | Obtain via an APTDS proxy |
| Operating System Event | Web Middleware (Web server) | Obtain via an APTDS proxy |
| Authentication Event | AAA Authentication System | Read a database of the AAA server, or obtain via a private interface with the AAA server |
| Application Event | Application | Obtain via an interface provided by the application |

After obtaining the events, the APTDS may perform format standardization processing for the events, e.g., arranging each original event to be a standard format event of the APTDS and writing the standard format event into a local database of the APTDS.

2) Flow Collection

Flow collection may include collecting original flow associated with an attack as an attack evidence which is stored for future reference, and may further include collecting a flow log for recording a communication action of network access for a user such that the flow log can be used to determine whether an abnormality exists in the network, and can be further used for subsequent data analysis.

In an example, the original flow associated with an attack may be collected as follows. A network entity device sending a security event writes the original flow corresponding to the event associated with a particular attack into a file, and uploads the file to the APTDS via the FTP. The APTDS receives the file, and stores the file in a local database of the APTDS for future use.

A flow log may be collected as follows. A FW, an IPS, or a network device, such as a switch and a router, records a processed flow into a flow log via a hardware plug-in card or software of a device, and sends the flow log to the APTDS. A format of the flow log include a NetFlow format, a NetStream format, etc. The APTDS receives the flow log, performs parsing and format standardization processing on the flow log, and writes the processed flow log into a local database of the APTDS.

3) Threat Intelligence Collection

Threat intelligence records information such as a threatening IP address, a threatening domain name, a threatening Uniform Resource Locator (URL), an event evidence and a threat disposal suggestion. The APTDS may interact with a threat intelligence source based on a Structured Threat Information eXpression (STIX) protocol or a Trusted Automated eXchange of Indicator Information (TAXII) protocol to obtain threat intelligence data, and may write the data into a local database of the APTDS. For example, the threat intelligence source includes Threatbook, 360 security cloud, and the like.

The APTDS may quickly and accurately detect whether there is a threat in a network by performing association with an event in the network based on an IP address, a domain name and a URL recorded in the threat intelligence.

4) Loophole Data Collection

In an example of the present disclosure, the APTDS may perform loophole scanning in advance to determine whether there is a weakness easily used by an APT attack in the network when it is considered that an APT attack may use loopholes of a host, a web and a database to take over a target network. The loophole scan may be for the loopholes on the host, the Web, the database and a network device, and illegal programs on the host. The weaknesses easily used by the APT attack may include that system configuration is imperfect, system patches is not untimely updated, there is a weak password, there is software not desired to be installed, or there is a process not desired to be appeared.

The APTDS may perform a loophole scanning operation as a loophole scanning server to obtain a scanning result, or may obtain a scanning result of loophole scanning software via an external interface provided by the loophole scanning software. The APTDS may write the scanning result into a local database of the APTDS after the scanning result is obtained.

At block 102, the APTDS performs association analysis for the communication data, and obtains threat data in the communication data based on an association analysis result.

The association analysis may be a data fusion technology for research on mutual relationship of different pieces of data, which can be used to perform unification, association and combination for multi-source data, thereby reducing false negative rate and false positive rate of the threat data.

For example, based on IP addresses, domain names and URLs recorded in the threat intelligence, events and flow log records associated with a same IP address, a same domain name or a same URL is obtained from the communication data, and are marked as the threat data.

For another example, a log record associated with a sensitive word is obtained from flow logs through keyword search. An event associated with the record is obtained from the communication data based on information such as a source IP address and a source port recorded in the log record, and is marked as the threat data.

At block 103, the APTDS maps each piece of the obtained threat data to a corresponding APT attack phase, where the APT attack phase is defined based on a kill chain model.

As described above, the APT attack process may be divided into a plurality of detectable APT attack phases in advance based on the kill chain model in an example of the present disclosure. For each piece of the obtained threat data, the APTDS may map the piece of the obtained threat data to the corresponding APT attack phase based on features of the obtained threat data.

There may be a plurality of implementation ways to divide an APT attack process into a plurality of APT attack phases. An implementation way is described below as an example.

The APT attack process is divided into 5 phases as follows.

1) An environment sensing phase, in which a loophole easily used by an attacker in a network is detected.

Since the APT attack may use a loophole of a host, a Web, and a database to take over a target network, the APTDS may perform loophole scanning in advance, and may determine whether there is a loophole easily used by the attacker in the network based on the obtained loophole data. When the threat data includes the loophole data, the APTDS may map the loophole data in the threat data to the environment sensing phase.

2) A survey and sniffing phase, in which the attacker detects a loophole on the attacked object.

An attacker may determine whether there is a loophole on the attacked object and whether the attacked object is possible to be attacked through behaviors, such as system scanning, port scanning, loophole scanning and protocol scanning. Hence, the APTDS may map events associated with intranet scanning behaviors to the survey and sniffing phase by obtaining event types of events in the threat data (such as port scanning, and excessively pinging packets).

3) A directional attacking phase, in which the attacker launches an attack onto the attacked object.

When the attacker launches the attack onto the attacked object, the attacker may attempt to log onto the attacked object or perform sabotage activities like DOS attacks to the attacked object, such as host blasting, Ping to Dealth, and Internet Control Message Protocol (ICMP) flooding. The attacks may be detected and reported to the APTDS by the FW. The APTDS may map events with the types in the threat data to the directional attacking phase.

4) A tool installing phase, in which the attacker implants an attack tool into the attacked object by using the loophole on the attacked object.

The behavior that the attacker implants the attack tool by using the loophole of the attacked object may be detected and reported to the APTDS by the IPS or a Web Application Firewall (WAF). The APTDS may map events associated with an extension script attack, a buffer overflow attack and an SQL injection attack in the threat data to the tool installing phase.

5) A suspicious activity phase, in which the attacker controls the attacked object to obtain data in the network or perform sabotage activities.

Attacks in the phase may include a worm attack, a spyware attack, illegal data transmission, etc. The worm attack and the spyware attack may be detected and reported to the APTDS by the IPS. Further, the APTDS may determine whether illegal data is transmitted by analyzing collected flow logs. For example, an internal payroll file is not allowed to be uploaded to a foreign website. When the APTDS detects that the payroll file is transmitted to a particular foreign IP address, the APTDS may regard that it is an illegal data transmission event. The APTDS may map events associated with the worm attack, the spyware attack and the illegal data transmission in the threat data to the suspicious activity phase.

After the threat data is identified and mapped to the APT attack phase, the APTDS may perform statistical operation and interface presentation for the threat data mapped to different APT attack phases. For example, the APTDS may divide one day into a plurality of set time periods. A round dot in each specific position on the interface expresses that the threat data corresponding to an APT attack phase appears in a corresponding time period of a corresponding date. A larger area of the dot, a greater an amount of the obtained threat data.

At block 104, for each piece of the threat data, the APTDS may perform prevention for a network entity associated with the piece of the threat data based on a prevention strategy corresponding to the APT attack phase to which the threat data is mapped.

In an example of the present disclosure, respective prevention strategies are further defined for the plurality of pre-divided APT attack phases.

For example, when the APT attack process is divided into the environment sensing phase, the survey and sniffing phase, the directional attacking phase, the tool installing phase, and the suspicious activity phase, the prevention strategies as follows may be pre-defined on the APTDS.

1) When the piece of the threat data is mapped to the environment sensing phase, the APTDS may determine a network entity with a loophole based on the piece of the threat data, and may generate a loophole warning to prompt a user to perform operations for the determined network entity, such as patching, removing unsafe configuration and killing virus and etc.

2) When the piece of the threat data is mapped to the survey and sniffing phase, the APTDS may distribute a set Access Control List (ACL) or a set security strategy to a FW or an IPS, and add an IP address of an attacker associated with the piece of threat data into blacklists of a network node associated with the piece of the threat data. The network node may be a device with at least one of control function, authentication function, forwarding function, routing function, service function in a network, e.g., a switch, a router, a database server, a SDN controller, an authentication server, a Web server, a Windows server, a Linux servers, and the like. In an example, the network node is a control node. For example, when the piece of the threat data is from an external network, the control node may be the FW, when the piece of the threat data is from an internal network, the control node may be an AAA server. A communication protocol between the APTDS and the FW and a communication protocol between the APTDS and the IPS may be Telnet, SSH or NetConf. The APTDS may configure the AAA server via a Representational State Transfer (REST) Application Programming Interface (API).

3) When the piece of the threat data is mapped to the directional attacking phase, the APTDS may distribute a set ACL or a set security strategy to the FW and the IPS, may reinforce the AAA server and a server associated with the piece of the threat data, and may add the IP address of the attacker associated with the piece of threat data into the blacklists of the control node associated with the piece of the threat data. The operation of reinforcing the AAA server and the server associated with the piece of the threat data may include a patching operation, or may be a path closing operation.

4) When the piece of the threat data is mapped to the tool installing phase, the APTDS may distribute the set ACL or the set security strategy to the FW and the IPS, may reinforce the AAA server and the server associated with the piece of the threat data, may distribute a WAF strategy to a WAF device and may add the IP address of the attacker associated with the piece of the threat data into the blacklists of the control node associated with the piece of the threat data. The APTDS may configure the WAF device via the REST API.

5) When the piece of the threat data is mapped to the suspicious activity phase, the APTDS may distribute the set ACL or the set security strategy to the FW and the IPS, may reinforce the AAA server and the server associated with the piece of the threat data, and may add the IP address of the attacker associated with the piece of threat data into the blacklists of the FW, the AAA server and the control node associated with the piece of the threat data.

So far, the process in FIG. 1 ends.

In the example of the present disclosure in FIG. 1, multi-source data such as the event, the flow, the threat intelligence and the loophole data is collected, thus, the collected data is more comprehensive. The threat data is obtained through the data association analysis, and is mapped to the corresponding APT attack phase, and the respective prevention strategies are taken for different APT attack phases. Thus, the process for the APT attack is targeted, and the APT attack can be effectively detected and prevented.

In an example of the present disclosure, the APTDS may further perform one or more of analyses as follows for the obtained communication data in the network to provide more comprehensive depiction and presentation of an APT attack.

1) Behavior Trajectory Analysis

For each piece of the threat data mapped to the survey and sniffing phase, the directional attacking phase, the tool installing phase or the suspicious activity phase, the APTDS may determine a suspicious IP address associated with the piece of the threat data, may query an event and a flow log associated with the suspicious IP address in the obtained communication data, and present the queried event and flow log in time sequence.

Thus, the communication data associated with the suspicious IP address can be obtained and connected in serial to form a complete APT attack time chain.

Figure 2:
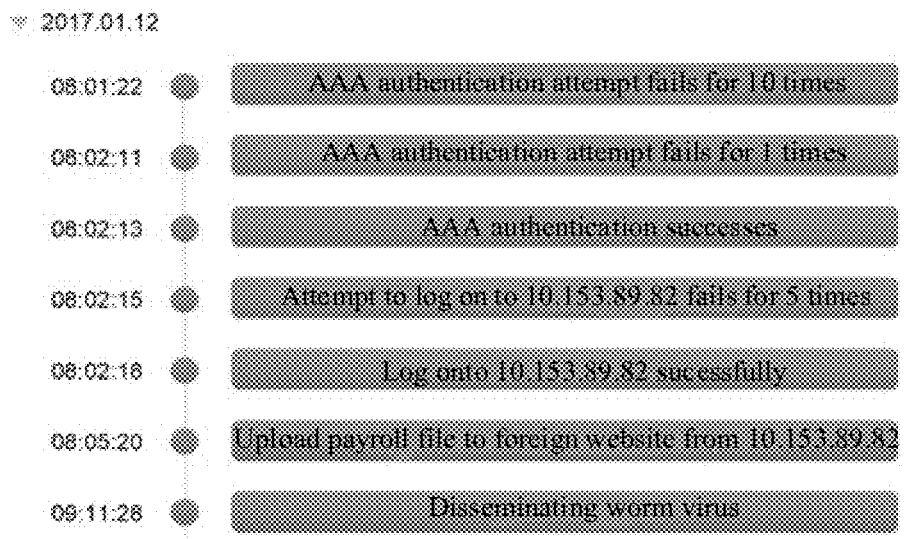
FIG. 2 is a schematic diagram illustrating a behavior trajectory analysis for a suspicious IP address by an APT Defense System (APTDS) based on an example of the present disclosure.

FIG. 2 is a schematic diagram illustrating a behavior trajectory analysis on a suspicious IP address by an APTDS based on an example of the present disclosure. In FIG. 2, based on the behavior trajectory analysis performed by the APTDS, a plurality of data sources and a plurality of types of events or log data can be integrated, and all relevant events and log data can be presented from perspective of the suspicious IP address, which may include data not obtained when the threat data is obtained (such as an AAA authentication success event at 08:02:13 and an event of successful log on to 10.153.89.82 at 08:02:18 in FIG. 2).

2) Multi-Dimension Analysis

The APTDS may collect up to hundreds of thousands of pieces of communication data each day. However, a user may not have enough time to focus on each piece of the communication data. Hence, the APTDS may analyze the communication data based on different dimensions to perform network risk evaluation and generate a security warning, thereby helping a user fully perceive security conditions and APT attack conditions in the network. In an example, there may be a plurality of dimensions as follows.

I. Event relationship analysis, to associate a plurality of events having different event types and associated with attacked objects with a same IP address, and search for an event associated with a same IP address, a same domain name and a same URL based on IP addresses, domain names and URLs recorded in the threat intelligence.

In an example, the event relationship analysis may be used for analyzing relationships of a security event (such as directed blasting, a DDOS attack, a suspicious authority enhancement behavior) and another type of events. For example, it is assumed that a fire wall reports that there is a DDOS attack in the network at a moment of ti, the APTDS may query events associated with the IP address of an attack target of the DDOS attack and reported after the moment ti in a local database of the APTDS through a regular expression. When the APTDS searches out an operating system event used for reporting that Central Processing Unit (CPU) utilization of a particular host is too high and the IP address of the host is same as the IP address of the attack target of the DDOS attack, the APTDS may determine that the DDOS attack successes.

In another example, the event relationship analysis may further be used for analyzing a relationship of threat intelligence data and an event in the network. For example, the APTDS may immediately generate a security warning when the APTDS detects an event associated with a malicious IP address, a malicious domain name or a malicious URL published by a threat intelligence source appears in the network.

II. Data digging and analysis for APT attack phase, to respectively perform analysis such as trend analysis and pie diagram analysis for pieces of threat data mapped to a same APT attack phase.

The APTDS may determine an APT attack phase to be researched and extract historical threat data mapped to the APT attack phase from a local database of the APTDS. The extracted historical threat data may be all the historical threat data or the historical threat data in a set period of time. Then, the APTDS may organize and present the threat data from different research perspectives. The research perspectives may be configured by a user via an interface on the APTDS.

For example, when it is desired to research on the number of occurrence times of directional attacks at a particular time period in future, the APTDS may extract threat data mapped to the directional attacking phase in a plurality of sequential days from a local database of the APTDS, obtain a direction and an amplitude of change about increase or decrease of the threat data associated with the directional attacking phase through trend analysis, such as a trend line, and obtains a possible number of occurrence times of directional attacks in future. When it is desired to research on a source of a directional attack, the APTDS may present, in a pie diagram, a statistical result of the number of times of directional attacks launched by a relevant network segment based on the extracted threat data associated with the directed attack phase, so as to prompt a user to investigate a network segment in which a greater number of directional attacks are launched.

III. Host dimension analysis, to perform statistical analysis and trend analysis for operating system events in the communication data.

The APTDS may extract the operating system events from the local database of the APTDS, and may organize and present the operating system events from different research perspectives.

For example, from a perspective of an event level (such as a warning level, a notification level and an error level), or from a perspective of an event type (such as logging in an operating system, logging out the operating system, adding an account and modifying the account), or from a perspective of an operating system type (such as a Windows system, a Linux system), the extracted communication data may be classified, and a pie diagram may be plotted based on a classification result to obtain percentages of different operating system events from the different perspectives.

IV. Application dimension analysis, to perform statistical analysis and trend analysis for application events in the communication data.

The APTDS may extract the application events reported by applications in the network, and may organize and present the extracted application events from different research perspectives.

For example, the application events the event level of which is the error level or the warning level may be extracted, and classification and calculation are performed for the extracted application events from the perspective of the application type (such as a social application type, a map navigation type, a call communication type and an online shopping payment type) to obtain which type of application is most vulnerable to be attacked, so as to prompt a user to reinforce protection for the type of application.

V. Database dimension analysis, to perform statistical analysis and trend analysis for database events in the communication data.

The APTDS may extract the database events reported by the database in the network and may organize and present the extracted database events from different research perspectives.

For example, database events the event level of which is the error level or the warning level may be extracted, classification and calculation are perform for the extracted database events from the perspective of the threat type (such as authority abuse, authority enhancement, SQL injection, insufficient identification authentication and backup data exposure) to obtain the number of occurrence times of the database events under different database threat types, so as to prompt a user which type of threat has most impact for the database.

Methods according to the present disclosure are described above. Systems according to the present disclosure are described below.

Figure 4:
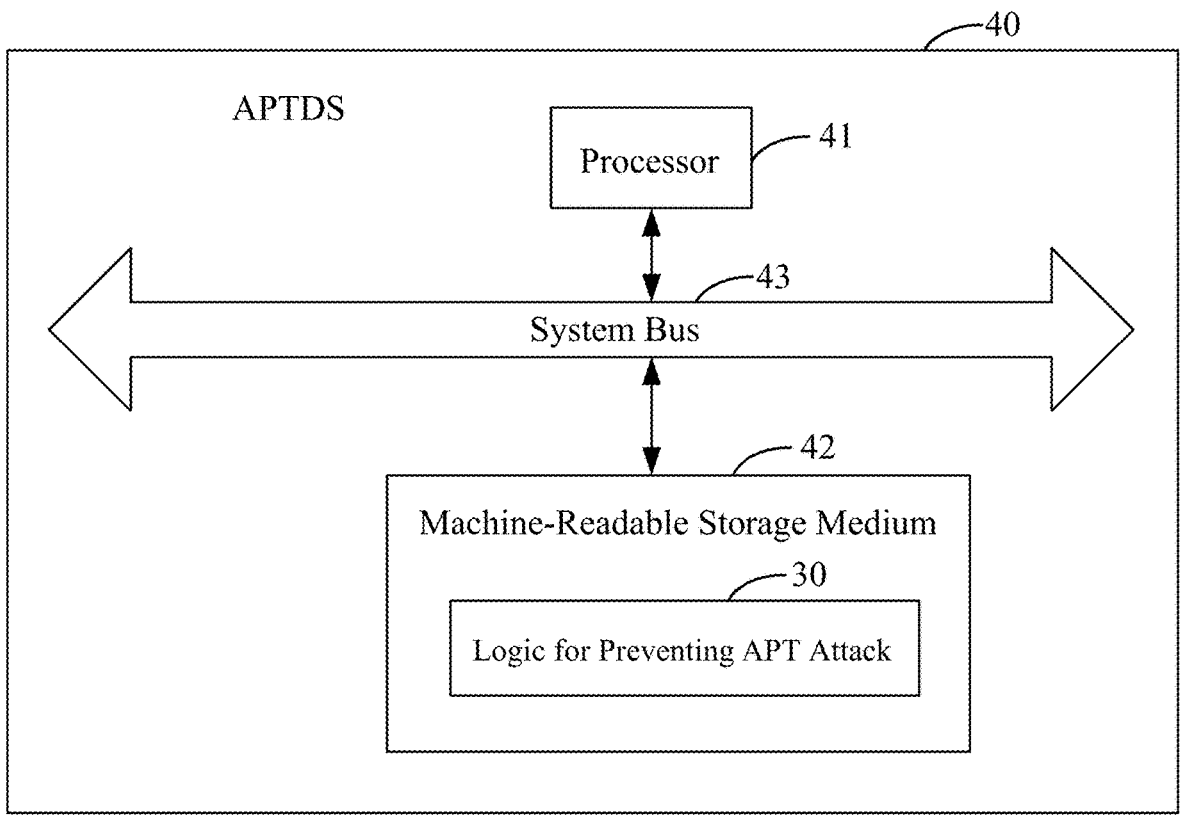
FIG. 4 is a diagram illustrating a hardware structure of a system based on an example of the present disclosure.

FIG. 4 schematically illustrates a hardware structure diagram of an APTDS, which is provided by an example of the present disclosure. The APTDS 40 may include a processor 41 and a machine-readable storage medium 42 storing machine executable instructions. The processor 41 may communicate with the machine-readable storage medium 42 via a system bus 43, and execute the method of preventing an APT attack described above by reading and executing the machine executable instructions corresponding to a logic for preventing an APT attack in the machine-readable storage medium 42.

As used herein, the machine-readable storage medium 42 may be any electronic, magnetic, optical, or other physical storage apparatus to contain or store information such as executable instructions, data, and the like. For example, any machine-readable storage medium described herein may be any of volatile storage medium, non-volatile storage medium and any type of storage medium, or a combination thereof. The volatile storage medium may be Random Access Memory (RAM). The non-volatile storage medium may be flash memory, a storage drive (e.g., a hard drive), a solid state drive, any type of storage disc (e.g., a compact disc, a DVD, etc.), and the like.

Figure 3:
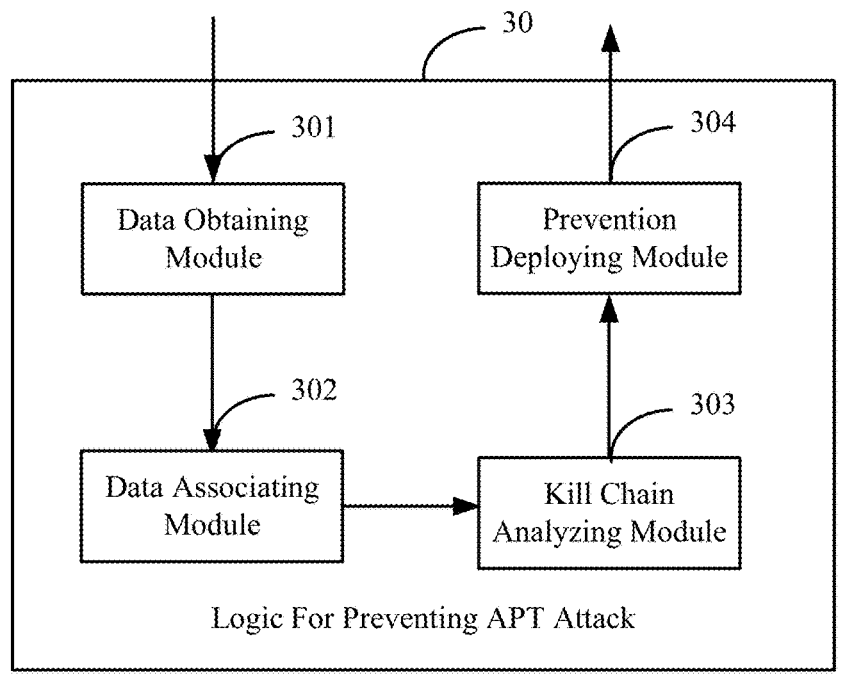
FIG. 3 is a schematic diagram illustrating a structure of a logic based on an example of the present disclosure.

As shown in FIG. 3, functionally divided, the logic 30 for preventing an APT attack above may include modules as follows.

A data obtaining module 301 is configured to obtain communication data in a network.

A data associating module 302 is configured to perform association analysis for the communication data, obtain threat data from the communication data based on an association analysis result.

A kill chain analyzing module 303 is configured to map each piece of the obtained threat data to a corresponding APT attack phase based on a kill chain model.

A prevention deploying module 304 is configured to perform, for each piece of the threat data, prevention for a network entity associated with the piece of the threat data based on prevention strategies corresponding to the plurality of APT attack phases.

In an example, the APT attack phases include phrases as follows. An environment sensing phase, in which a loophole used by an attacker in a network is detected. A survey and sniffing phase, in which the attacker detects the loophole on an attacked object. A directional attacking phase, in which the attacker launches an attack onto the attacked object. A tool installing phase, in which the attacker implants an attack tool into the attacked object through the loophole on the attacked object. A suspicious activity phase, in which the attacker controls the attacked object to obtain data in the network or performs sabotage activities.

In an example, the communication data comprises at least one of the followings: an event, a flow, threat intelligence and loophole data. The event comprises at least one of the followings: a security event, an operating system event, a database event, an application event and an authentication event. The flow comprises at least one of the followings: an original flow associated with the attack and a flow log for recording a communication activity for network access.

In an example, the prevention strategies include strategies as follows. When a piece of the threat data is mapped to the environment sensing phase, the prevention deploying module 304 is configured to determine a network entity with the loophole based on the piece of the threat data, and perform at least one of a patching operation, a unsafe configuration removing operation and a killing virus operation for the determined network entity. When the piece of the threat data is mapped to the survey and sniffing phase, the prevention deploying module 304 is configured to distribute a set Access Control List (ACL) or a set security strategy to a Fire Wall (FW) and an Invasion Prevention System (IPS), and add an Internet Protocol (IP) address of the attacker associated with the piece of the threat data into respective blacklists of the control node associated with the piece of the threat data. When the piece of the thread data is mapped to the directional attacking phase, the prevention deploying module 304 is configured to distribute the set ACL or the set security strategy to the FW and the IPS, reinforce the AAA server and a server associated with the piece of the threat data, and add the IP address of the attacker associated with the piece of the threat data into the respective blacklists of the FW, the control node associated with the piece of the threat data. When the piece of the threat data is mapped to the tool installing phase, the prevention deploying module 304 is configured to distribute the set ACL or the set security strategy to the FW and the IPS, reinforce the AAA server and the server associated with the piece of the threat data, distribute a Web Application Firewall (WAF) strategy to a WAF device, and add the IP address of the attacker associated with the piece of the threat data into the respective blacklists of the control node associated with the piece of the threat data. When the piece of the threat data is mapped to the suspicious activity phase, the prevention deploying module 304 is configured to distribute the set ACL or the set security strategy to the FW and the IPS, reinforce the AAA server and the server associated with the piece of the threat data, and add the IP address of the attacker associated with the piece of the threat data into the respective blacklists of the control node associated with the piece of the threat data.

In an example, the system may further include a behavior trajectory analyzing module.

The behavior trajectory analyzing module is configured to for each piece of the threat data mapped to the survey and sniffing phase, the directional attacking phase, the tool installing phase or the suspicious activity phase, determine a suspicious IP address associated with the piece of the threat data, search for events and flow logs associated with the suspicious IP address in the communication data, and present the events and the flow logs searched out in time sequence.

In an example, the system may further include a multi-dimension analyzing module.

The multi-dimension analyzing module is configured to perform at least one of analyses as follows to evaluate network risk and generate a security warning.

The at least one of the analysis includes analysis as follows.

Event relationship analysis is to associate a plurality of events having different event types and respectively associated with attacked objects with a same IP address, and search for events associated with a same IP address, a same domain name or a same Uniform Resource Locator (URL) based on IP addresses, domain names and URLs recorded in the threat intelligence.

Data digging and analysis for APT attack phase is to perform respective analysis for pieces of the threat data mapped to a same APT attack phase.

Host dimension analysis is to perform statistical analysis and trend analysis for operating system events in the communication data.

Application dimension analysis is to perform statistical analysis and trend analysis for application events in the communication data.

Database dimension analysis is to perform statistical analysis and trend analysis for database events in the communication data.

Thus, the description about the system shown in FIG. 3 ends.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of preventing an Advanced Persistent Threat (APT) attack, applied to an APT Defense System, the method comprising:
   obtaining communication data in a network;
   performing association analysis for the communication data;
   obtaining threat data from the communication data based on an association analysis result;
   mapping each piece of the obtained threat data to a corresponding APT attack phase of a plurality of APT attack phases based on a kill chain model, wherein the plurality of APT attack phases are a plurality of detectable phases obtained by dividing a process of the APT attack in advance based on the kill chain model; and
   performing, for each piece of the threat data, prevention for a network entity associated with the piece of the threat data based on prevention strategies corresponding to the plurality of APT attack phases;
   wherein the plurality of APT attack phases comprise:
      an environment sensing phase, in which a loophole used by an attacker in the network is detected;
      a survey and sniffing phase, in which the attacker detects the loophole on an attacked object;
      a directional attacking phase, in which the attacker launches an attack onto the attacked object;
      a tool installing phase, in which the attacker implants an attack tool into the attacked object through the loophole on the attacked object; and
      a suspicious activity phase, in which the attacker controls the attacked object to obtain data in the network or perform sabotage activities; and the prevention strategies comprise:

when a first piece of the threat data is mapped to the environment sensing phase, a network entity with the loophole is determined based on the first piece of the threat data, and at least one of a patching operation, an operation for removing unsafe configuration and an operation for killing virus is performed for the determined network entity;

when a second piece of the threat data is mapped to the survey and sniffing phase, a set Access Control List (ACL) or a set security strategy is distributed to a FireWall (FW) and an Invasion Prevention System (IPS), and an Internet Protocol (IP) address of the attacker associated with the second piece of the threat data is added into respective blacklists of a control node associated with the second piece of the threat data;

when a third piece of the thread data is mapped to the directional attacking phase, the set ACL or the set security strategy is distributed to the FW and the IPS, an Authentication-Authorization-Accounting (AAA) server and a server associated with the third piece of the thread data are reinforced, and an IP address of the attacker associated with the third piece of the threat data is added into respective blacklists of a control node associated with the third piece of the threat data;

when a fourth piece of the threat data is mapped to the tool installing phase, the set ACL or the set security strategy is distributed to the FW and the IPS, an AAA server and a server associated with the fourth piece of the thread data are reinforced, a Web Application Firewall (WAF) strategy is distributed to a WAF device, and an IP address of the attacker associated with the fourth piece of the threat data is added into respective blacklists of a control node associated with the fourth piece of the threat data; and when a fifth piece of the threat data is mapped to the suspicious activity phase, the set ACL or the set security strategy is distributed to the FW and the IPS, an AAA server and a server associated with the fifth piece of the threat data are reinforced, and an IP address of the attacker associated with the fifth piece of the threat data is added into respective blacklists of a control node associated with the fifth piece of the threat data.

2. The method according to claim 1, wherein the communication data comprises at least one of: an event, a flow, threat intelligence and loophole data;

the event comprises at least one of: a security event, an operating system event, a database event, an application event and an authentication event; and the flow comprises at least one of: an original flow associated with the attack, and a flow log for recording a communication activity for network access.

3. The method according to claim 2, further comprising:

performing at least one of analyses as follows to evaluate network risk and generate a security warning, an event relationship analysis, to associate a plurality of events having different event types and respectively associated with attacked objects with a same IP address, and search for events associated with a same IP address, a same domain name or a same Uniform Resource Locator (URL) based on IP addresses, domain names and URLs recorded in the threat intelligence;

data digging and analysis for APT attack phase, to perform respective analysis for pieces of the threat data mapped to a same APT attack phase;

host dimension analysis, to perform statistical analysis and trend analysis for operating system events in the communication data;

application dimension analysis, to perform statistical analysis and trend analysis for application events in the communication data; and database dimension analysis, to perform statistical analysis and trend analysis for database events in the communication data.

4. The method according to claim 1, further comprising:

for each piece of the threat data mapped to the survey and sniffing phase, the directional attacking phase, the tool installing phase or the suspicious activity phase, determining a suspicious IP address associated with the piece of the threat data;

searching for events and flow logs associated with the suspicious IP address in the communication data; and presenting the events and the flow logs searched out in time sequence.

5. The method according to claim 1, wherein the control node comprises at least one of a FireWall (FW), an AAA server, a Windows server and a Linux server.

6. An Advanced Persistent Threat (APT) Defense System, comprising:

a processor, and a non-transitory machine-readable storage medium storing machine-executable instructions which are executable by the processor to:

obtain communication data in a network;

perform association analysis for the communication data;

obtain threat data from the communication data based on an association analysis result;

map each piece of the obtained threat data to a corresponding APT attack phase of a plurality of APT attack phases based on a kill chain model, wherein the plurality of APT attack phases are a plurality of detectable phases obtained by dividing a process of the APT attack in advance based on the kill chain model; and perform, for each piece of the threat data, prevention for a network entity associated with the piece of the threat data based on prevention strategies corresponding to the plurality of APT attack phases;

wherein the plurality of APT attack phases comprise:

an environment sensing phase, in which a loophole used by an attacker in the network is detected;

a survey and sniffing phase, in which the attacker detects the loophole on an attacked object;

a directional attacking phase, in which the attacker launches an attack onto the attacked object;

a tool installing phase, in which the attacker implants an attack tool into the attacked object through the loophole on the attacked object; and a suspicious activity phase, in which the attacker controls the attacked object to obtain data in the network or perform sabotage activities; and the prevention strategies comprise:

when a first piece of the threat data is mapped to the environment sensing phase, a network entity with the loophole is determined based on the first piece of the threat data, and at least one of a patching operation, an operation for removing unsafe configuration and an operation for killing virus is performed for the determined network entity;

when a second piece of the threat data is mapped to the survey and sniffing phase, a set Access Control List (ACL) or a set security strategy is distributed to a FireWall (FW) and an Invasion Prevention System (IPS), and an Internet Protocol (IP) address of the attacker associated with the second piece of the threat data is added into respective blacklists of a control node associated with the second piece of the threat data;

when a third piece of the thread data is mapped to the directional attacking phase, the set ACL or the set security strategy is distributed to the FW and the IPS, an Authentication-Authorization-Accounting (AAA) server and a server associated with the third piece of the threat data are reinforced, and an IP address of the attacker associated with the third piece of the threat data is added into respective blacklists of a control node associated with the third piece of the threat data;

when a fourth piece of the threat data is mapped to the tool installing phase, the set ACL or the set security strategy is distributed to the FW and the IPS, an AAA server and a server associated with the fourth piece of the threat data are reinforced, and a Web Application Firewall (WAF) strategy is distributed to a WAF device, and an IP address of the attacker associated with the fourth piece of the threat data is added into respective blacklists of a control node associated with the fourth piece of the threat data; and when a fifth piece of the threat data is mapped to the suspicious activity phase, the set ACL or the set security strategy is distributed to the FW and the IPS, an AAA server and a server associated with the fifth piece of the threat data are reinforced, and an IP address of the attacker associated with the fifth piece of the threat data is added into respective blacklists of a control node associated with the fifth piece of the threat data.

7. The system according to claim 6, wherein the communication data comprises at least one of: an event, a flow, threat intelligence and loophole data;

the event comprises at least one of: a security event, an operating system event, a database event, an application event and an authentication event; and the flow comprises at least one of: an original flow associated with the attack, and a flow log for recording a communication activity for network access.

8. The system according to claim 7, wherein the processor is further caused by the machine-executable instructions to:

perform at least one of analyses as follows to evaluate network risk and generate a security warning, an event relationship analysis, to associate a plurality of events having different event types and respectively associated with attacked objects with a same IP address, and search for events associated with a same IP address, a same domain name or a same Uniform Resource Locator (URL) based on IP addresses, domain names and URLs recorded in the threat intelligence;

data digging and analysis for APT attack phase, to perform respective analysis for pieces of the threat data mapped to a same APT attack phase;

host dimension analysis, to perform statistical analysis and trend analysis for operating system events in the communication data;

application dimension analysis, to perform statistical analysis and trend analysis for application events in the communication data; and database dimension analysis, to perform statistical analysis and trend analysis for database events in the communication data.

9. The system according to claim 6, wherein the processor is further caused by the machine-executable instructions to:

for each piece of the threat data mapped to the survey and sniffing phase, the directional attacking phase, the tool installing phase or the suspicious activity phase, determine a suspicious IP address associated with the piece of the threat data;

search for events and flow logs associated with the suspicious IP address in the communication data; and present the events and the flow logs searched out in time sequence.

10. The system according to claim 6, wherein the control node comprises at least one of a FW, an AAA server, a Windows server and a Linux server.

11. A non-transitory machine-readable storage medium storing machine-executable instructions which are invoked and executed by a processor of a network device to:

obtain communication data in a network;

perform association analysis for the communication data;

obtain threat data from the communication data based on an association analysis result;

map each piece of the obtained threat data to a corresponding APT attack phase of a plurality of APT attack phases based on a kill chain model, wherein the plurality of APT attack phases are a plurality of detectable phases obtained by dividing a process of the APT attack in advance based on the kill chain model; and perform, for each piece of the threat data, prevention for a network entity associated with the piece of the threat data based on prevention strategies corresponding to the plurality of APT attack phases;

wherein the plurality of APT attack phases comprise:

an environment sensing phase, in which a loophole used by an attacker in the network is detected;

a survey and sniffing phase, in which the attacker detects the loophole on an attacked object;

a directional attacking phase, in which the attacker launches an attack onto the attacked object;

a tool installing phase, in which the attacker implants an attack tool into the attacked object through the loophole on the attacked object; and a suspicious activity phase, in which the attacker controls the attacked object to obtain data in the network or perform sabotage activities; and the prevention strategies comprise:

when a first piece of the threat data is mapped to the environment sensing phase, a network entity with the loophole is determined based on the first piece of the threat data, and at least one of a patching operation, an operation for removing unsafe configuration and an operation for killing virus is performed for the determined network entity;

when a second piece of the threat data is mapped to the survey and sniffing phase, a set Access Control List (ACL) or a set security strategy is distributed to a FireWall (FW) and an Invasion Prevention System (IPS), and an Internet Protocol (IP) address of the attacker associated with the second piece of the threat data is added into respective blacklists of a control node associated with the second piece of the threat data;

when a third piece of the thread data is mapped to the directional attacking phase, the set ACL or the set security strategy is distributed to the FW and the IPS, an Authentication-Authorization-Accounting (AAA) server and a server associated with the third piece of the thread data are reinforced, and an IP address of the attacker associated with the third piece of the threat data is added into respective blacklists of a control node associated with the third piece of the threat data;

when a fourth piece of the threat data is mapped to the tool installing phase, the set ACL or the set security strategy is distributed to the FW and the IPS, an AAA server and a server associated with the fourth piece of the thread data are reinforced, a Web Application Firewall (WAF) strategy is distributed to a WAF device, and an IP address of the attacker associated with the fourth piece of the threat data is added into respective blacklists of a control node associated with the fourth piece of the threat data; and when a fifth piece of the threat data is mapped to the suspicious activity phase, the set ACL or the set security strategy is distributed to the FW and the IPS, an AAA server and a server associated with the fifth piece of the threat data are reinforced, and an IP address of the attacker associated with the fifth piece of the threat data is added into respective blacklists of a control node associated with the fifth piece of the threat data.

* * * * *